July 21, 1953 H. F. HOBBS 2,646,150
TORQUE AND SPEED RESPONSIVE FLUID CLUTCH
Filed Sept. 27, 1949 5 Sheets-Sheet 1

Inventor
Howard F. Hobbs
By Young, Emmet & Thompson
Attys.

Inventor
HOWARD F. HOBBS

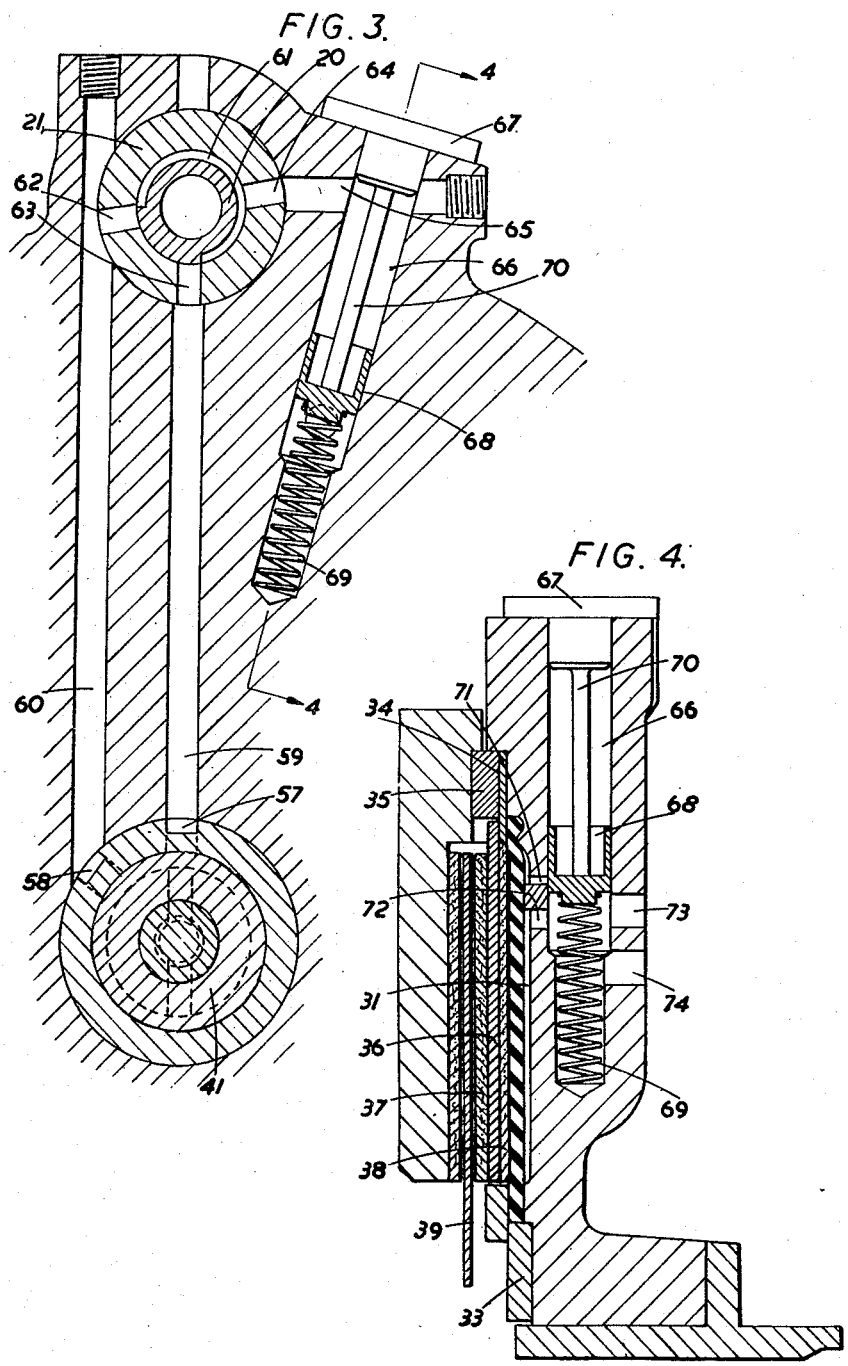

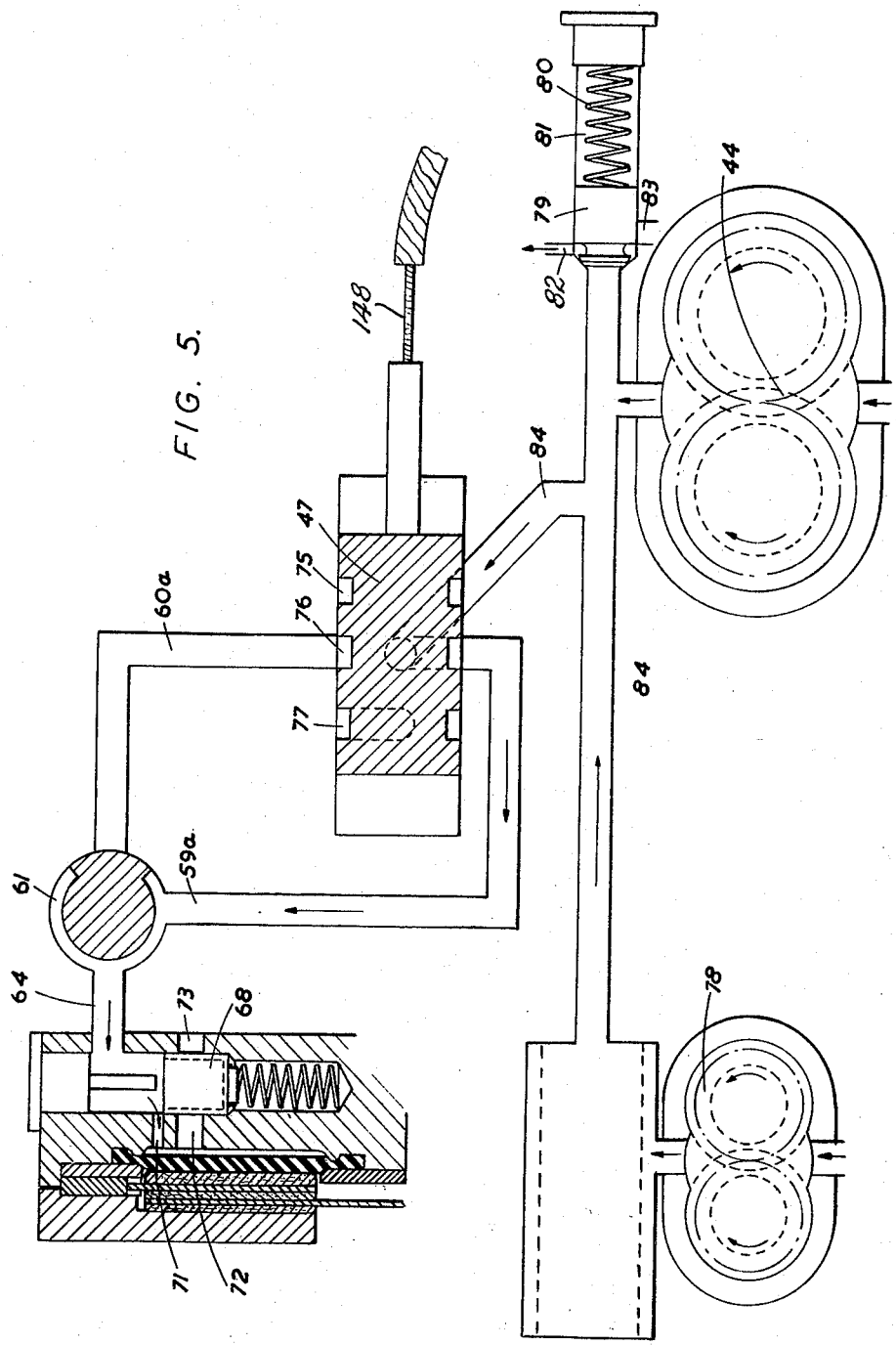

July 21, 1953        H. F. HOBBS        2,646,150
TORQUE AND SPEED RESPONSIVE FLUID CLUTCH
Filed Sept. 27, 1949        5 Sheets-Sheet 5
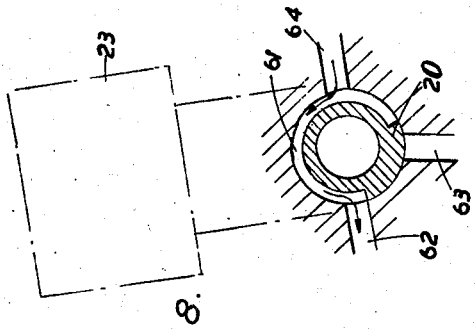
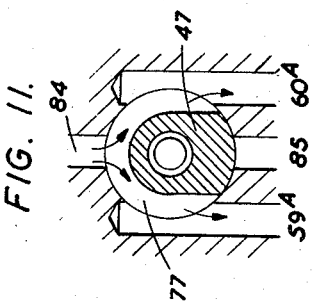
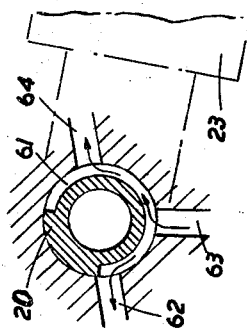
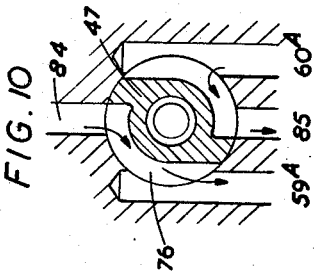
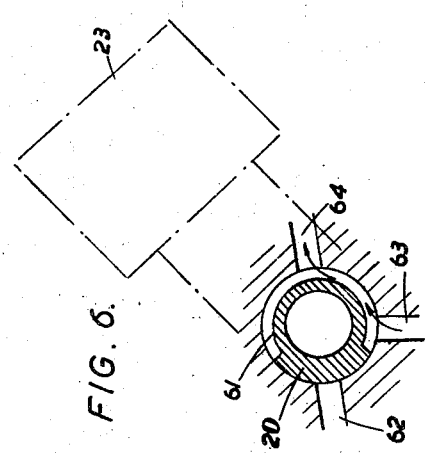
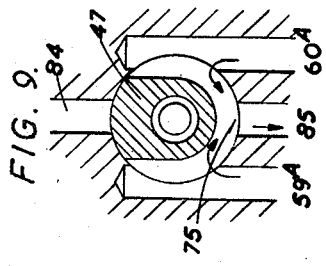
Inventor
Howard F. Hobbs
By
Young, Parnell & Thompson
Attys.

Patented July 21, 1953

2,646,150

UNITED STATES PATENT OFFICE 2,646,150

TORQUE AND SPEED RESPONSIVE FLUID CLUTCH

Howard Frederick Hobbs, Leamington Spa, England, assignor to Hobbs Transmission Limited, Leamington Spa, England, a British company Application September 27, 1949, Serial No. 118,146
In Great Britain September 28, 1948

12 Claims. (Cl. 192—85)

This invention relates to power transmission apparatus and particularly to transmission apparatus for aircraft of the kind having a rotating sustaining rotor or rotors which are normally driven in flight by one or more engines, and arranged so that should the engine stop or cease to deliver sufficient power to drive the rotors the drive connecting the engine to the rotors is automatically uncoupled. For this purpose a freewheel is usually incorporated in the transmission system. It is also common to employ a friction clutch in addition to a free-wheel so that the rotor system may be coupled and uncoupled when desired, for example when starting up the engine and rotor.

A brake is sometimes incorporated owing to the fact that the rotors continue to rotate when the aircraft is on the ground and the engine stopped because of the free-wheel.

Advantages are to be obtained from the use of a friction clutch which can be engaged at will by the pilot, and in the case of an aircraft of this kind with two or more engines the use of friction clutches enables one or another to be engaged or disengaged at will. One engine may be started from the other thus saving the weight of additional starting equipment.

It is desirable in a transmission system for the aforesaid purpose to provide some resilient means to damp torque fluctuation and vibration which may be transmitted to and from the engine and rotor systems. Owing to the fact that the moment of inertia of the rotor system is large considerable difficulty results when engaging an engine to the system, for if the clutch is not engaged very smoothly excessively large stresses may be introduced, particularly in the rotor blades and hub. Furthermore, if the clutch is engaged smoothly the period of slip may be unduly great tending in the case of a normal dry plate clutch to damage the friction surfaces. It is desirable, therefore, to provide a clutch which will automatically slip on over-load during starting and which is capable of absorbing appreciable slip power.

According to the present invention a transmission system includes at least one hydraulically actuated friction clutch and flexible means between the clutch and the engine shaft associated with a control means whereby predetermined displacements of the flexible means shuts and/or exhausts hydraulic pressure so as to disengage the clutch.

According to the preferred form of the invention the flexible means comprise centrifugally actuated weights carried by part of the clutch and connected to the engine shaft whereby relative movement between the engine shaft and the clutch causes each weight to move with or against the centrifugal action thereby providing flexibility, said movement being transmitted to said control means.

An advantage to be obtained from the use of centrifugal weights in place of other resilient means such as springs, is that the resilience or stiffness of the flexible connection varies with the speeds at which the mechanism is operating, since the centrifugal action varies with the speed and accordingly a coupling of this kind can be designed to avoid critical speeds at which vibration occurs. In the case of a coupling having springs the critical speed remains constant and since the speed of the impulses, from the engine for example, varies there may be certain speeds at which vibration is prone to occur.

At best the energy which can be absorbed by springs and the deflection provided is limited and such a coupling is difficult to arrange. Centrifugal weights enable almost unlimited flexibility to be obtained and a relatively great amount of energy stored. A flexible coupling of this sort may be simple, durable and of low weight.

A further advantage provided by the arrangement of the centrifugal weights and the control means is due to the weights taking up positions dependent on the torque being transmitted and the speed at which the weights are rotated about the axis of the apparatus. The control means can be caused to operate over predetermined ranges of position at different predetermined speeds. This feature may be utilised for providing automatic disengagement at low speeds or on over-load, for example to avoid over-load when starting.

The friction surfaces of the clutch are preferably lubricated so as to prevent wear and damage due to relatively long periods of slip when starting.

The clutch may be engaged for the purpose of braking, for example when stopping the rotors after the engine has been stopped.

The invention will now be described by way of example with reference to the accompanying diagrammatic drawings wherein:

Figure 3 is a part section on the line 3—3 of Figure 1;

Figure 4 is a part section on the line 4—4 of Figure 3;

Figure 5 is a diagrammatic drawing showing the arrangement of the pumps, a relief valve, a control valve and the control means incorporated in the apparatus;

Figures 6, 7, 8 are part sections on the line 3—3 of Figure 1 showing a control valve in three different operating positions (normal running, excessive torque, and overrunning respectively);

Figures 9, 10 and 11 are part sections through the valve 47 in Figure 1 showing a control means in three different positions, viz., free engine, normal running and engine re-starting respectively.

Figure 1:
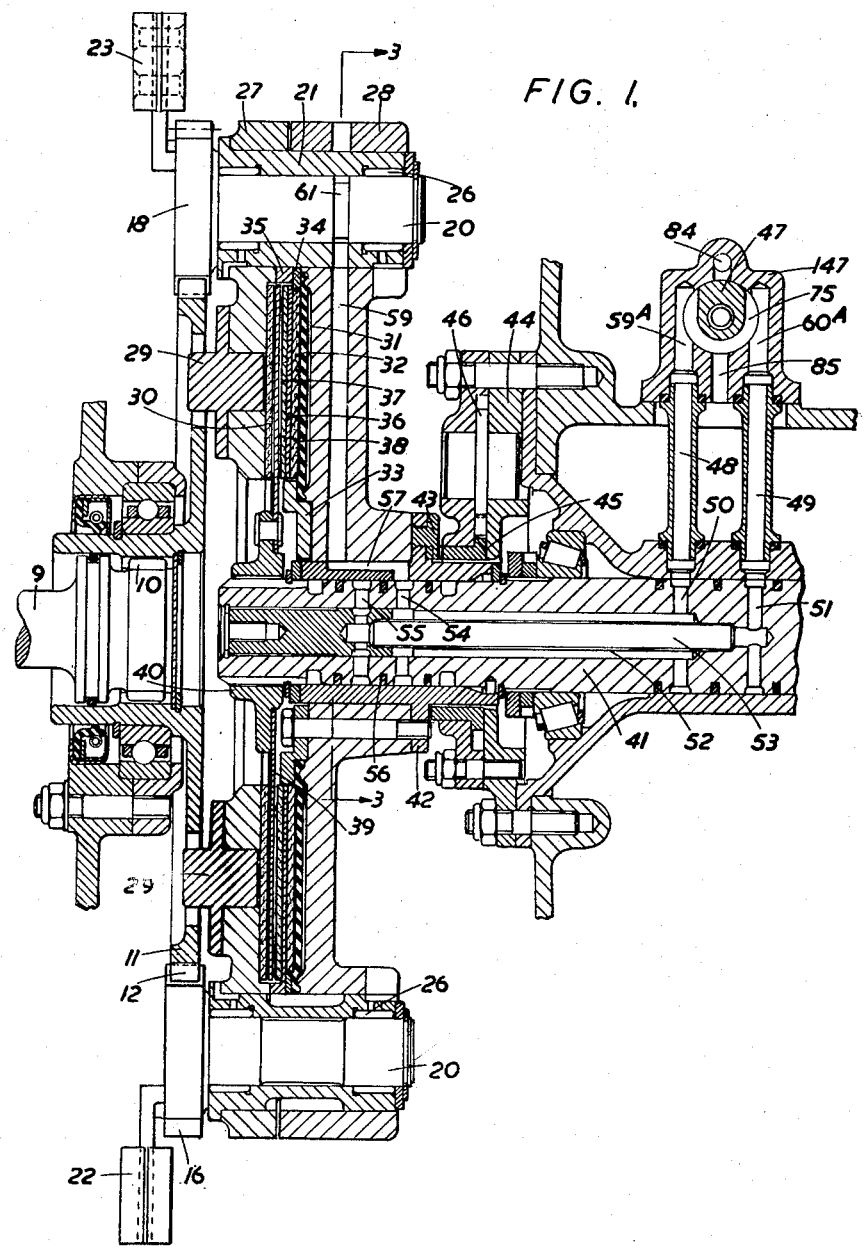
Figure 1 is a sectional view of part on line I—I of Figure 2 of a transmission apparatus embodying the invention.
Figure 2:
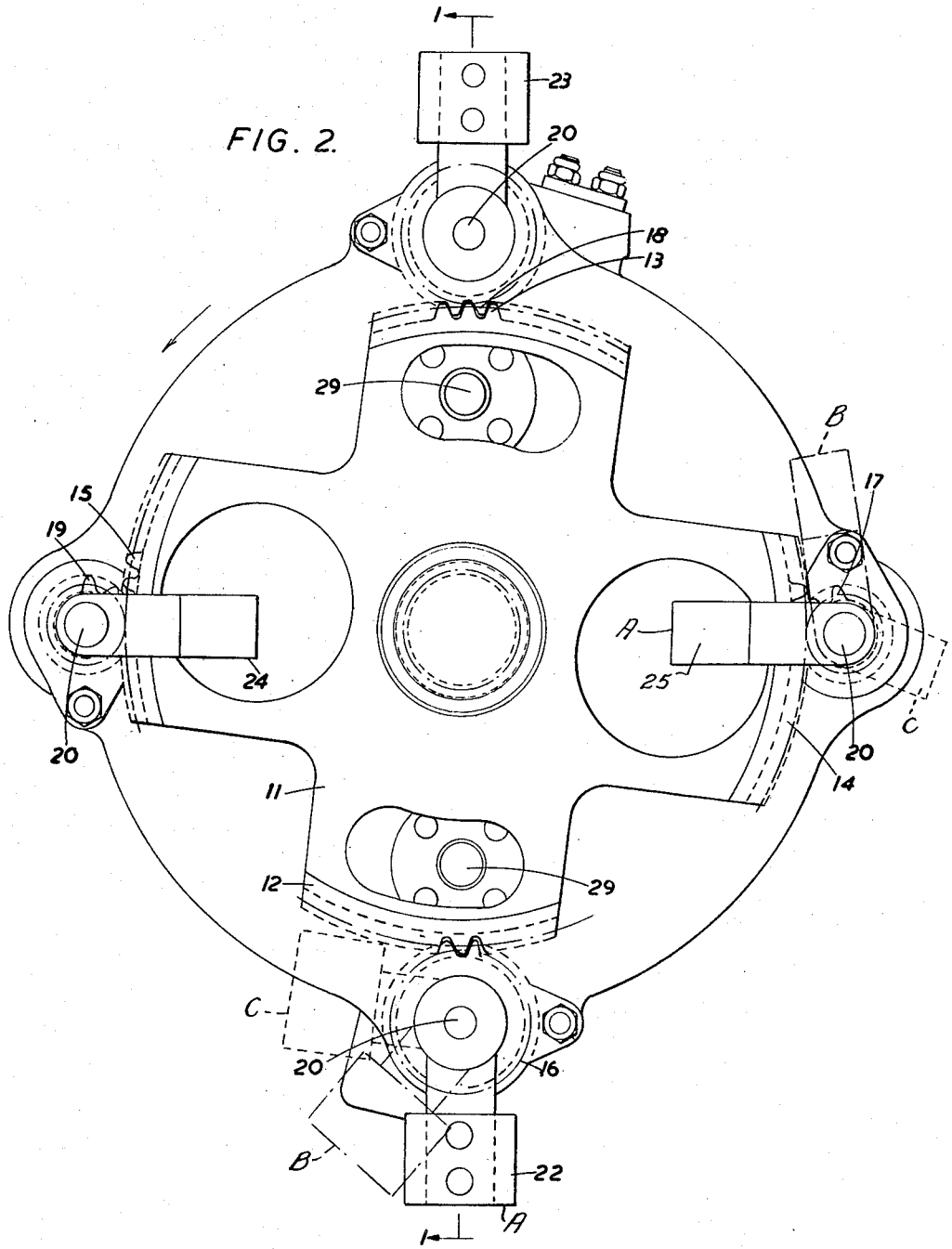
Figure 2 is an end view of the apparatus showing an arrangement of centrifugal weights.

Referring first to Figures 1 and 2, an input member or shaft 9 which transmits power from an engine, drives a plate 11 through teeth 10. The plate 11 has gear segments 12, 13, 14, 15, which mesh with pinions 16, 17, 18, 19, which are mounted on spindles 20, and which carry the centrifugal weights 22, 23, 24, 25.

The spindles are mounted in roller bearings 26 which are carried in a rotary member comprising a clutch front plate 27 and clutch back plate 28. The front plate 27 carries stops 29 which contact with the plate 11 should it tend to rotate beyond given position in relation to the plate 27. The front plate 27 also carries an input friction part in the form of a friction facing 30. The back plate 28 has an annular recess covered by the synthetic rubber diaphragm 32 which is clamped at its outer and inner diameters by clamp rings 33, 34 (shown more clearly in Figure 4) to form a liquid pressure receiving space 31. A further ring 35 is provided with a series of teeth or projections on its inner diameter which mesh with teeth or projections on a plate 36. The plate 36 carries a friction facing 37 on the one side and an insulator plate 38 on the other side. An output friction part in the form of a spinner plate 39 is located between the friction facings 30, 37 and mounted upon the splined hub 40 which engages an output shaft 41 which may transmit the power through an arrangement of gearing to a rotor system. A sleeve 42 is bolted to the back plate 28 and carries a projection 43 which drives the gears 45, 46 of a pump 44. A control valve 47 is axially adjustable in a valve housing 147 by a control cable 148. The housing 147 has an inlet duct 84 connected to the outlet of the pump 44 an exhaust duct 85, and two channels 59a, 60a.

The valve 47 has channels 75, 76, 77 of different shape which is shown in Figures 9, 10 and 11, as follows: In the "free engine position" of the valve 47 (Figure 9) fluid is directed by channel 75 from channels 59a, 60a, to the exhaust 85. In the "normal running" position of the valve 47 (Figure 10) fluid is directed by channel 76 from the inlet 84 to the channel 59a, whilst fluid from 60a is directed into the exhaust 85. In the "engine restarting" position (Figure 11) fluid is directed by channel 77 from the inlet 84 into both channels 59a, 60a.

The channels 59a, 60a, in the housing 147 lead to tubes 48, 49, drillings 50, 51 and passages 52, 53 and drillings 54, 55 in the shaft 41. Seal rings such as shown at 56 prevent excessive leakage. The sleeve 42 carries oil ducts 57, 58 (Figure 3) which connect drillings 54, 55 to channels 59, 60 in the back plate 28. The spindle 20 carrying the pinion 18, and the centrifugal weight 23, forms the control means and is provided with a groove 61 which can mate with ports 62, 63, 64 in a bushing 21. The ports 62, 63, communicate respectively with the channels 60, 59. The port 64 connects with a drilling 65 which leads to a radial bore 66 sealed at the outer end by a plug 67.

Figure 6 shows the normal running position of the groove 61 in which it connects port 63 to port 64. Figure 7 shows the "excessive torque" position in which the groove 61 connects 63 to both 62 and 64. Figure 8 shows the overrunning position in which the groove 61 shuts 63 and opens 64 to 62.

A piston valve 68 operates in the bore 66 and is urged outwards by spring 69. A stop pin 70 locates the valve 68 in its outer position. Ports 71, 72 connect the radial bore to the space 31. Ports 73, 74 provide exhausts.

The apparatus includes an additional pump 78 (Figure 5) which drives from the output member 41 or rotor system and a relief valve 79 and spring 80 which operate in a bore 81 so as to limit the pressure that can be delivered by the pumps. The valve 79 opens to the lubricating oil channel 82 and the exhaust 83. Oil ducts 84 connect the pumps to the control valve 47, which has an exhaust port 85 and delivery ports 59a, and 60a.

In operation the shaft 9 drives the plate 11 which tends to rotate the centrifugal weights 22, 23, 24, 25 when the plates 27, 28 are stationary. The stops 29 tend to contact the plate 11 but as soon as 27, 28 begin to rotate the centrifugal force acting upon the weights tends to hold them in the position shown in Figure 2. If the plates are being driven in the direction shown by the arrow any resistance to rotation will tend to cause the weights to rotate on the spindles causing the weights 22, 23 to take up a position between the positions shown in Figure 2 and that shown for excessive torque in Figure 7. The weights will take up an angular position in which the torque exerted by centrifugal action will equal the resistance on the plates 27, 28 and it will be understood that the driving torque is zero when the weights are in the radial positions as shown in Figure 2. Should the plates 27, 28 tend to over-run i. e., drive the engine, then the weights will rotate to a position as indicated for overrunning in Figure 8.

The purpose of the smaller weights 24, 25, which have smaller pinions and therefore rotate through a greater angle for a given movement of the plate 11, is to partially balance the effect of the weights 22, 23 in positions near to the radial position. This ensures that the weights can make appreciable movement on their spindles for a relatively small change in torque. Since the small weights are geared at twice the ratio of the larger weights they pass through twice the angle and therefore act in opposition to the larger weights over part of the travel and together with the larger weights over the remaining travel, as shown by the dotted positions, Figure 2.

The arrangement of the two sets of weights is particularly advantageous since it permits relatively large movement for small changes in torque near the "no torque" position which enables appreciable movement of the control means for varying the engagement of the clutch, and it provides a much greater degree of flexibility.

With the engine running the plates 27 and 28 will be driven at the same speed as the engine. If the control valve 47 is in the free engine position (Figure 9), ports 59a, 60a, which lead to channels 59, 60 are open to the exhaust 85. If the control means is moved to the position shown for normal running (Figure 10) the port 60a, is open to the exhaust 85, but the port 59a is open to oil ducts 84. The pressure reaches the channel 59 through 48, 50, 52, 54, 57. Since the plates 27, 28 are driving the oil pump 44 there will be a slight resistance to drive and the weight 23 will be in such a position that the pressure can pass the port 63, the groove 61, ports 64 and channel 65 and will thereupon act at the outer end of valve 68. This will cause the valve to move inwards to the position shown Figure 5, and the pressure will pass into the space 31 through inlet port 71, causing the clutch to become engaged. This will drive the shaft 41. If the torque becomes excessive in speeding up, for example the rotor system, the weight 23 will move to the "excessive torque" position, Figure 7, in which case the groove 61 will also open to the port 62, and some of the pressure will therefore escape through channels 60, 55, 53, 51, 49, 60a, 75, 85. This will prevent excessive torque being applied until such time as the speed of the plates 27, 28 is sufficiently great, or the load is sufficiently reduced, to cause the weights 22, 23 to move outwards, thus closing the port 62. The shaft 41 will now be driven at the same speed as the engine and the plates 27, 28. The centrifugal weights will, however, continue to take up positions in which the torque delivered by the engine is transmitted, and hence any variation in the power required to drive the system and in the torque delivered by the engine will be smoothed by movement of the weights on the spindles. Should the engine cease to drive the plates 27, 28, for example if the throttle is shut or if the engine fails, the weights 22, 23 will take up the position shown "over-running" (Figure 8) in which position the groove 61 will pass beyond the port 63 and open to the port 62. This will exhaust the pressure from the outer end of the valve 68 since 62 leads to the exhaust 85 and the valve 68 will thereupon move outwards to the position shown Figure 4, when any liquid in the space 31 will escape through the exhausts 72, 73, thereby completely disengaging the clutch. If it is required to restart the engine the valve 47 can be moved to the positions shown "engine restarting" Figure 11, in which case the pressure from the pumps reaching 84 is led to both ports 59a and 60a, and will therefore pass to port 64, the valve 68 and the space 31 irrespective of the position of the groove 61, since it will take up a position where it opens either 62, 63 or both to 64. The valve 47 can at any time be moved to the "free engine" position, in which case the clutch will disengage. With the weights in the normal running range of positions the clutch may be engaged by moving the valve to the normal running position, but should the weights be in other positions the clutch may be engaged by moving the valve to the "restarting" position.

Should the engine be stopped and the rotor system continue to rotate when the aircraft is on the ground the valve 47 can be held in the "restarting" position so as to apply the clutch to cause the rotors to be brought to a standstill. The valve 47 may be arranged with a detent so that it can be located in either the "free engine" or "normal running" position, but a spring may be provided whereby it must be held in the "restarting" position. The purpose of such an arrangement is to prevent the valve being left in the "restarting" position, in which case the clutch would not automatically disengage on "over-run." Sufficient liquid may be allowed to enter the clutch for lubrication purposes by leakage past the rings 56 or between the part 42 and the plate 28. Alternatively an oil feed may be provided from 52, 53. Oil may be sprayed on to the plate 11 and through the openings therein from an oil feed pipe leading to the housing of the apparatus from the channel 82. The relief valve 79, 80, 81 is arranged to lift at some predetermined pressure when it will first pass liquid to the channel 82 and then to the exhaust 83. The arrangement ensures that there is pressure in the channel 82 which leads to various parts of the apparatus for the purpose of lubrication.

In one embodiment of the invention two clutches, as shown in Figure 1, transmit the power from two engines to two shafts 41, through bevel gearing and spur gearing to two rotor drive plates which in turn transmit the power to two sustaining rotors, the spur gears being geared together by idler pinions so that the sustaining rotors may be kept in the correct relative positions and both driven from the one engine when desired. In the case of failure of one or both engines the clutches will automatically free, as above described, or if desired the pilot may move the control valve 47 of one unit so as to disengage the clutch and associated engine. The pump 78 is driven from the rotor system so that should both engines be stationary and therefore both pumps 44, the clutches may be engaged, for example for the purpose of restarting one or both engines by means of the liquid pressure delivered by the pump 78.

The apparatus may be applied to various forms of transmission and not necessarily to aircraft.

I claim:

1. A power transmission apparatus having an input clutch, said clutch including an input member, input and output friction parts, fluid pressure actuated means for effecting engagement between said input and output friction parts, and a rotary member carrying said input friction part, a set of devices connecting said input member and rotary member together flexibly, said devices comprising at least one centrifugally acting weight pivotally carried by one of said members, and relatively movable connecting means connecting said weight to the other of said members, the relative movement of said members causing the weight to move towards and away from its outermost position thereby acting respectively with and against the centrifugal force on the weight to provide resilience between said input member and rotary member, means for providing supply and exhaust of fluid pressure to and from said clutch, control means for controlling said supply and exhaust, and an operative connection between one of said members and said control means whereby said relative movements operate the control means for engaging and disengaging said clutch.

2. A power transmission apparatus having an input member, at least one fluid pressure actuated friction clutch, said clutch including input and output friction parts, fluid pressure actuated means for effecting engagement between said input and output friction parts, and a rotary member carrying said input friction part, a set of devices connecting said input member and rotary member together flexibly, said devices comprising at least one centrifugally acting weight pivotally carried by one of said members, at least one toothed pinion connected to said weight, and a toothed part carried by the other of said members in mesh with said toothed pinion, the relative movement of said members causing the weight to move towards and away from its outermost position, thereby acting respectively with and against the centrifugal force on the weight to provide resilience between said input member and rotary member, means for providing supply and exhaust of fluid pressure to and from said clutch, control means for controlling said supply and exhaust, and an operative connection between one of said elements and said control means whereby said relative movements operate the control means for engaging and disengaging said clutch.

3. Apparatus as claimed in claim 2 in which at least two such weights of different mass are connected by such pinions to said toothed part so that the weights of different mass act in opposition over part of the said relative movement.

4. Apparatus as claimed in claim 1 having at least one spindle mounted rotatably in said rotary member of the clutch on an axis parallel to and offset from the axis of the clutch, said spindle carrying said weight whereby said relative movement causes the spindle to rotate, and in which the control means comprises said spindle, said spindle having a groove which mates with delivery and exhaust ducts in different positions.

5. Apparatus as claimed in claim 1 in which the control means has three ranges of positions, one in which the pressure is led to the clutch, another in which the pressure is prevented from reaching the clutch and is clutch exhausted, and another in which at least some of the pressure is allowed to escape from the clutch.

6. Apparatus as claimed in claim 1 having two liquid channels in said rotary member leading to the clutch, both of which serve as liquid feed channels in one position of the control means and at least one of which acts as an exhaust channel in another position of the control means.

7. Apparatus as claimed in claim 1 having a manually operated valve which can be located in three positions, a first position in which fluid pressure is exhausted from the clutch, a second position in which fluid pressure is supplied to the clutch through said control means, and a third position in which fluid pressure is supplied to the clutch irrespective of the position of said control means, and resilient means for urging said manually operated valve out of its third position.

8. Apparatus as claimed in claim 1 having a valve operating in a radial bore in said rotary member of the clutch, means including a spring for moving the valve radially outwards by the spring and inwards by liquid pressure, said valve serving to open entry and exhaust ports respectively to the clutch.

9. Apparatus as claimed in claim 1 in which means are provided for limiting the relative rotary movement of said members.

10. Apparatus as claimed in claim 1 having two pumps driven respectively by the input and output members of the clutch, and a control valve having a common inlet duct connected to the output of said pumps and the outlet from which control valve leads to said control means.

11. Apparatus as claimed in claim 2 wherein at least one said weight is geared to the input shaft at a greater gearing ratio than another said weight, whereby one weight can at one time act with the first weight and at another period can act in opposition to the first weight thereby permitting relatively large movement between the input member and the clutch for small changes in torque near the no torque position.

12. Apparatus as claimed in claim 1 wherein the control means is adapted to connect either of two channels to a port leading to the clutch so as in one position to exhaust through one channel, in another position to receive fluid from the other, and in a third position to supply fluid from one channel both to the other channel and to the said port, said channels also being controlled by a control-valve movable to any of three positions in one of which both channels are connected to exhaust, in a second both channels are connected to a fluid inlet, and in a third position one channel is connected to exhaust and the other to fluid supply.

HOWARD FREDERICK HOBBS.

References Cited in the file of this patent

UNITED STATES PATENTS

| Number | Name | Date |
| --- | --- | --- |
| 2,091,919 | Freeborn | Aug. 31, 1937 |
| 2,277,554 | McCoy | Mar. 24, 1942 |
| 2,462,825 | Zimmerman et al. | Feb. 22, 1949 |
| 2,485,621 | McNairy | Oct. 25, 1949 |

FOREIGN PATENTS

| Number | Country | Date |
| --- | --- | --- |
| 643,678 | Germany | Sept. 27, 1934 |
| 726,652 | Germany | Oct. 17, 1942 |